United States Patent [19]

Jacobsen

[11] Patent Number: 4,526,236
[45] Date of Patent: Jul. 2, 1985

[54] FIELD MARKER FOR A SPRAYER BOOM

[75] Inventor: Ralph O. Jacobsen, Kyle, Canada

[73] Assignee: Kyle Welding & Machine Shop Ltd., Kyle, Canada

[21] Appl. No.: 579,448

[22] Filed: Feb. 13, 1984

[30] Foreign Application Priority Data

Mar. 8, 1983 [CA] Canada .................................. 423114

[51] Int. Cl.³ .............................................. A01B 69/02
[52] U.S. Cl. .................................................. 172/126
[58] Field of Search ............... 172/126, 127, 128, 129, 172/130, 131, 132, 456

[56] References Cited

U.S. PATENT DOCUMENTS

| 2,843,034 | 7/1958 | Doran | 172/128 |
| 2,975,841 | 3/1961 | Oehler | 172/128 |
| 3,524,508 | 8/1970 | West | 172/126 |
| 4,365,674 | 12/1982 | Orthman | 172/126 |

FOREIGN PATENT DOCUMENTS 1030828  4/1965  United Kingdom ................ 172/126

OTHER PUBLICATIONS

AMCO-Hydraulic Row Markers 4 and 6 Row Adjustable, Advertising brochure of AMCO Yayo City, Miss, 9/1972.

*Primary Examiner*—Richard J. Johnson
*Attorney, Agent, or Firm*—Stanley G. Ade

[57] ABSTRACT

A single disc field marker comprises a support arm pivotally mounted on the end of the sprayer boom and carrying on its end a rotatable disc. The disc is supported so that in one position it lies in a plane which is substantially vertical and parallel to the direction of motion of the boom and can be adjusted readily by movement of the support arm through 90 to a second position in which the outer surface of the disc is inclined so the top edge is outward of the bottom edge and the rear edge is inward of the front edge. The first position can be used to form a furrow in bare land and the second position can be used with standing crop to gently lie the crop to one side.

6 Claims, 5 Drawing Figures

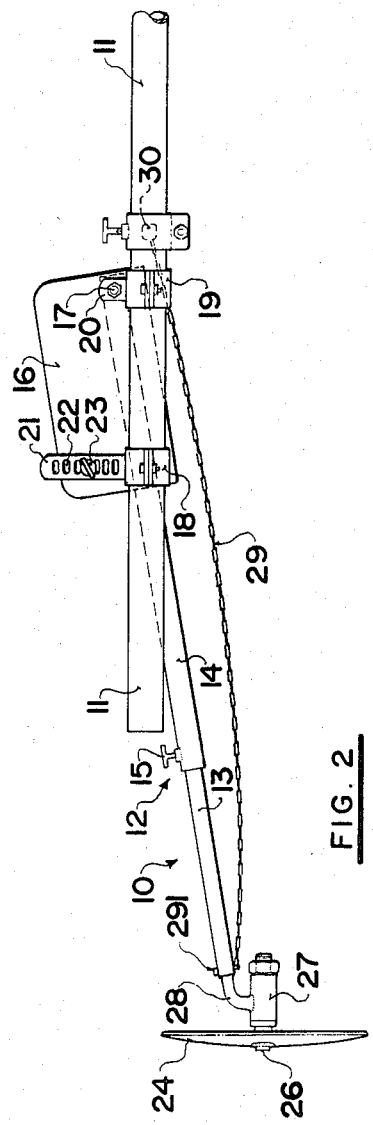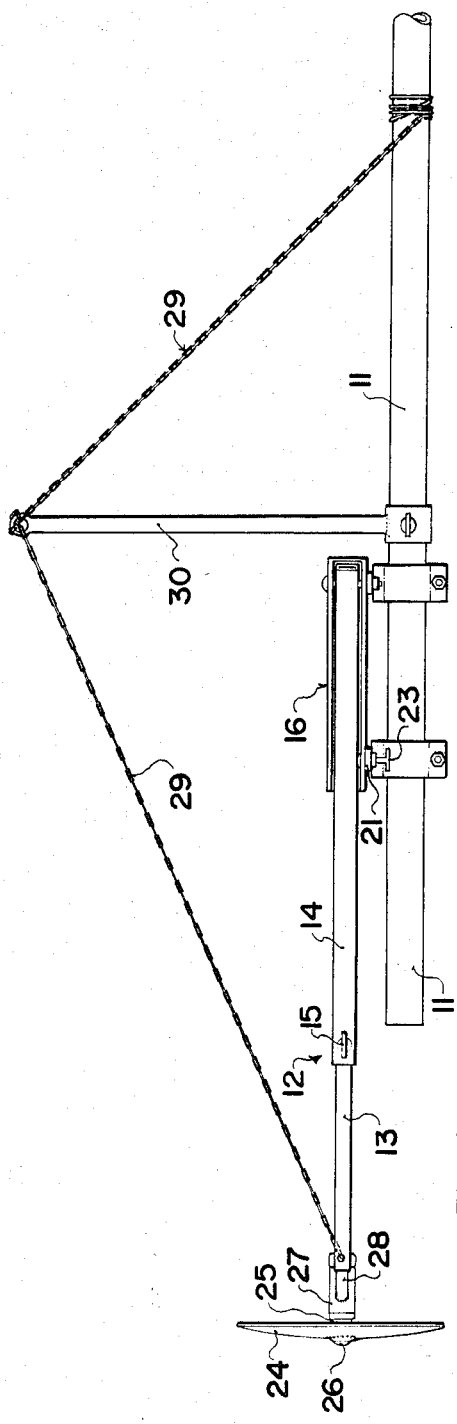

FIELD MARKER FOR A SPRAYER BOOM

BACKGROUND OF THE INVENTION

This invention relates to a field marker for a sprayer boom of the type which is supported on the end of the sprayer boom and mechanically acts upon the ground or crop to form a line which can subsequently be followed in a further passage of the sprayer boom.

One problem which such mechanical markers have to encounter is the fact that they have to act at various times of the year on bare ground and on the ground when covered with crop of various types.

Particularly when used with crop, it is necessary for the marker to provide a visible line while not seriously damaging the crop to avoid losses which could become considerable if spraying is repeated on the same crop.

SUMMARY OF THE INVENTION

It is one object of the invention therefore to provide a field marker which is suitable for use with both bare ground and with various crops.

Accordingly, the invention provides a field marker for a farming implement comprising a support arm, means for mounting the support arm on one end of the farming implement such that it extends generally outwardly from the end of the implement and downwardly therefrom towards the ground, a disc, means mounting the disc on the end of the support arm for rotation about the axis of the disc in contact with the ground and means for changing the angle of the disc relative to the support arm.

It is one advantage of the invention therefore that it can be manufactured very simply and inexpensively from readily available parts.

It is a further advantage of the invention that the disc can be readily adjusted in angle to provide marking of the bare ground using a substantially vertical position of the disc and also marking of various crops by angling the disc so that the crops are gently bent in one direction without serious damage.

It is a further advantage of the invention that the change of angle of the disc can be very readily achieved by rotating the support arm about its axis.

It is a still further advantage of the invention that it includes a mounting of the support arm on the sprayer boom which allows pivotal movement of the support arm upwards and downwards to accommodate varying ground surfaces with a limitation of the downward movement to prevent the disc dropping onto very low levels of ground or into water.

With the foregoing in view, and other advantages as will become apparent to those skilled in the art to which this invention relates as this specification proceeds, the invention is herein described by reference to the accompanying drawing forming a part hereof, which includes a description of the best mode known to the applicant and of the preferred typical embodiment of the principles of the present invention, in which:

DESCRIPTION OF THE DRAWINGS

FIG. 1 is a plan view of a single disc field marker attached to the left-hand end of the sprayer boom.

FIG. 2 is a rear elevation of the single disc field marker of FIG. 1.

In the drawings like characters of reference indicate corresponding parts in the different figures.

DETAILED DESCRIPTION

Figure 3:
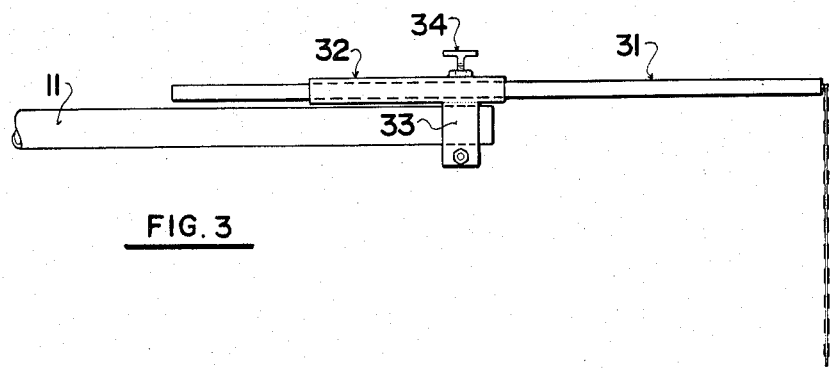
FIG. 3 is a plan view of a suitable gauge mechanism for following a mark formed by the marker of FIGS. 1 and 2 and mounted on the right-hand end of the boom.

The single disc field marker generally indicated at 10 is mounted on a conventional sprayer boom 11, the details of which are not included as they are well known to those skilled in the art.

The marker 10 comprises a support arm 12 which is formed of two square cross section tubes 13 and 14, one of which slides within the other 14 to provide telescopic adjustment of the length of the support arm. The adjustment is controlled by a clamping screw 15 which is screw threaded to the outer tube 14 so as to clamp the inner tube 13 at a desired position. The support arm 13 is pivotally mounted on the boom 11 by a channel shaped support member 16. The member 16 has upstanding walls defining an elongate channel with the end of the portion 14 secured to the side walls by a pivot pin 17 extending through the side walls. The member 16 is itself carried on the sprayer boom 11 by a pair of clamps 18, 19 which provide adjustment of the angle of the channel member 16 relative to the boom 11. For this purpose, the clamp 19 comprises a collar around the boom 11 with an upstanding flange 20 on one side of the boom to which one upstanding wall of the channel member 16 is secured by the pin 17. In this way, the channel member 16 is pivotal about the pin 17 with a support arm 12. The other clamp 18 comprises a similar collar around the boom 11 with a flange 21 upstanding from one side thereof adjacent the upstanding side wall of the member 16.

The flange 21 includes a series of slotted holes 22 by which a bolt 23 passing through the upstanding side wall of the member 16 can be secured at a position adjustable along the length of the flange. The series of slotted holes enables adjustment to be made readily without moving the clamp 18 left or right on the sprayer boom 11.

Adjustment of the angle of the member 16 relative to the pin 17 controls the lowest position to which the support member 12 can descend before contacting the bottom of the channel member 16. This adjustment can be used to prevent the marker falling too low when encountering very low land, particularly adjacent water.

On the end of the support arm 12 is carried a disc 24 comprising a cultivator disc which is conventional in the industry and readily available, mounted on the conventional shank 25 for rotation relative thereto on a bearing 26. Such a disc, shank and bearing is readily available. The shank 25 is carried in a sleeve 27 to which it is secured by suitable means, for example, nut 271. The sleeve 27 is supported on the end of the support bar 12 by a connector bar 28 which extends into the tubular portion 13 and is secured thereto by a pin 291 extending through the openings in the portion 13 and a corresponding opening in the bar 28.

The bar 28 is shaped so that with the boom on level ground and the support bar 12 extending downwardly from the pivot pin 17 to the bar 28, the disc 24 lies in a substantially vertical plane parallel to the direction of normal motion of the boom 11. Thus, the bar 28 as shown in FIG. 1 lies in the same plane as the support bar 12 which extends generally outwardly parallel to the boom 11 but as shown in FIG. 2, provides an angle between the sleeve 27 and the support arm 12 of the order of 10° to 20°. In this way, with the support arm lying at this angle to the ground, the axis of the sleeve is substantially horizontal providing a vertical orientation of the disc 24. Obviously, as the level of the ground varies, the angle of the disc to the vertical will also vary but only over a relatively small amount.

Figure 5:
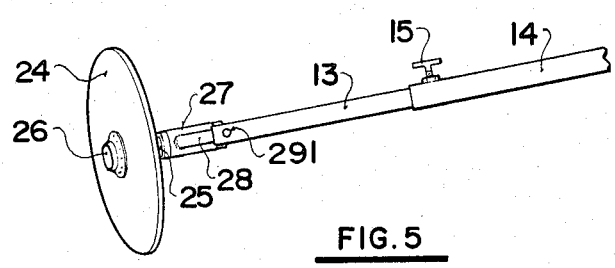
FIG. 5 is a rear elevation of the disc and support arm shown in FIG. 4.
Figure 4:
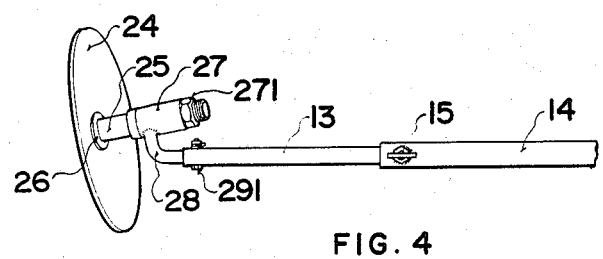
FIG. 4 is a schematic plan view similar to that of FIG. 1 but showing only the disc and support arm in an adjusted position of the disc.

As shown in FIGS. 4 and 5, the inner portion 13 can be removed from the portion 14 and replaced therein at an angle of 90° relative to the original position. Thus, as shown, the disc is turned so that in the direction of movement of the boom the front edge of the disc lies outwardly of the rear or trailing edge of the disc. In addition, the top of the disc lies outwardly of the bottom of the disc.

Reverting now to FIGS. 1 and 2, the position of the support arm 12 forwardly and backwardly of the boom 11 is controlled by a chain 29 affixed at one end to the end of the portion 13 adjacent the disc 24 and at the other end to a forwardly extending support arm 30. To provide lateral support of the arm 30 so that rearward force on the disc 24 does not act to bend the arms 12 and 30, the chain extends beyond the end of the arm 30 to the boom 11 at a position spaced along the boom from the arm 30. Thus, the chain acts to communicate rearward forces on the disc 24 caused by the ground as the disc moves over the ground to compressive forces of the arm 30 which can readily be resisted.

Thus, with the support arm 12 extending substantially straight out from the end of the boom 11 and the boom 11 being moved forwardly at right angles to its length, the disc 24 is moved across the ground. With the position shown in FIGS. 1 and 2, the disc can be used with bare ground to form a furrow which is readily visible after the marker has passed over the ground. This furrow can readily be followed in guiding a further path of the boom by a chain gauge mounted on the opposite end of the boom comprising a support bar 31 extending outwardly from the boom to a position adjustable by a clamping mechanism comprising a sleeve 32, mounting clamp 33 and adjusting screw 34. A chain carried on the end of the arm 31 depends downwardly into the furrow and runs along the furrow to readily show when the gauge has moved from a position vertically above the furrow.

The position of the disc 24 as shown in Figures 4 and 5 can be used with standing crop. In this position, the crop is moved gently aside by the disc as it moves across the ground since the outward face of the disc acts to contact a strip of the standing crop and move it gently outwardly to lie at an angle defined by the angle of the disc to the vertical. Thus, a narrow divided path is formed in the crop which is readily visible and can be readily followed in the next path of the boom.

The arrangement provides therefore a very simple construction manufactured from readily available parts which allows a single marker tool to be used both on bare ground and with a standing crop. A marker can be used on both ends of the boom if it is required to operate from both ends of a field or can be provided on only one end of the boom with the chain gauge provided on the opposite end.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A field marker for attachment to a spray boom comprising a support arm, means for mounting the support arm on one end of the implement such that it extends generally outwardly from the end of the implement and downwardly therefrom towards the ground, a disc, means mounting the disc on the end of the support arm for rotation about the axis of the disc in contact with the ground and means for changing the angle of the disc relative to the support arm, said support arm being formed from a single elongate tubular member and providing the sole rigid interconnection between said disc and said boom, said mounting means including a first collar for surrounding the boom, a second collar for surrounding the boom spaced from the first, a support member mounted on said first and second collars and providing front and rear parallel walls for in use standing in vertical planes longitudinal of said boom, means pivotally mounting said support arm between said walls for movement in a vertical plane therebetween, a third a third collar for surrounding the boom, said third collar supporting a strut for projecting at right angles to the boom forwardly therefrom and flexible coupling means for extending from said boom to an end of said strut remote from the boom and therefrom to said support arm for resisting rearward movement of said support arm relative to the boom.

2. A marker according to claim 1 wherein the means for changing the angle is arranged to change the disc from a first position in which it lies substantially in a vertical plane parallel to the direction of motion of the boom to a second position in which the front edge of the disc lies outwardly of the trailing edge of the disc.

3. A marker according to claim 1 wherein the axis of the disc is inclined to the length of the support arm and wherein the means for changing the angle comprises means for rotating the axis of the disc about the length of the support arm.

4. A marker according to claim 3 wherein the support arm comprises a first portion of square cross section movable within a sleeve of cooperating cross section whereby the end of the support arm adjacent the disc can be rotated relative to the other end thereof through 90°.

5. A marker according to claim 1 wherein the support member includes a transverse wall interconnecting said parallel walls for limiting the downward pivotal movement of the support arm to prevent the disc following very low levels of ground.

6. A marker according to claim 1 including means for adjusting the length of the support arm to vary the position of a disc relative to the boom.

* * * * *